United States Patent
Shao et al.

(10) Patent No.: US 8,325,686 B2
(45) Date of Patent: Dec. 4, 2012

(54) METHOD AND SYSTEM FOR CHANNEL TIME ALLOCATION AND ACCESS CONTROL IN WIRELESS NETWORK FOR HIGH-DEFINITION VIDEO TRANSMISSION

(75) Inventors: Huai-Rong Shao, San Jose, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1367 days.

(21) Appl. No.: 11/787,576

(22) Filed: Apr. 17, 2007

(65) Prior Publication Data

US 2007/0253391 A1 Nov. 1, 2007

Related U.S. Application Data

(60) Provisional application No. 60/793,451, filed on Apr. 20, 2006.

(51) Int. Cl.
*H04L 5/14* (2006.01)
*H04B 7/204* (2006.01)
*H04B 7/212* (2006.01)
*H04J 3/00* (2006.01)
*H04W 72/00* (2009.01)

(52) U.S. Cl. ........ 370/337; 370/294; 370/321; 370/345; 455/450; 455/451

(58) Field of Classification Search .................. 370/321, 370/345, 337, 294; 455/434, 450, 451
See application file for complete search history.

(56) References Cited

U.S. PATENT DOCUMENTS

| | | | |
|---|---|---|---|
| 5,999,127 A * | 12/1999 | Dezelan | 342/359 |
| 6,526,036 B1 * | 2/2003 | Uchida et al. | 370/342 |
| 6,865,609 B1 | 3/2005 | Gubbi et al. | |
| 6,961,316 B2 | 11/2005 | Yamaguchi et al. | |
| 7,359,351 B2 | 4/2008 | Cho et al. | |
| 7,379,443 B2 | 5/2008 | Ahuja et al. | |
| 7,489,682 B2 | 2/2009 | Kubota | |
| 7,508,781 B2 | 3/2009 | Liu et al. | |
| 7,564,862 B2 | 7/2009 | Srikrishna et al. | |

(Continued)

FOREIGN PATENT DOCUMENTS

EP 1478135 A2 11/2004

(Continued)

OTHER PUBLICATIONS

Notification of Transmittal of the International Search Report and Written Opinion for International Application No. PCT/KR2007/002445 dated Jan. 17, 2008.

(Continued)

*Primary Examiner* — Jean Gelin
*Assistant Examiner* — Edd Rianne Plata
(74) *Attorney, Agent, or Firm* — Kenneth L. Sherman, Esq.; Michael Zarrabian, Esq.; Sherman & Zarrabian LLP

(57) ABSTRACT

A channel time allocation and access control process for communication in wireless networks is provided. The channel time is divided into channel time blocks (CTBs), including one or more reserved CTBs and one or more unreserved CTBs. Schedules are implemented, wherein one or more periodic, equal-sized CTBs are reserved for isochronous streams. Dynamic CTB extension and truncation allow flexible channel time allocation.

66 Claims, 15 Drawing Sheets

U.S. PATENT DOCUMENTS

| | | | |
|---|---|---|---|
| 7,653,024 | B2 | 1/2010 | Dekorsy et al. |
| 7,903,614 | B2 | 3/2011 | Pietraski |
| 2002/0027894 | A1* | 3/2002 | Arrakoski et al. ............ 370/338 |
| 2004/0029591 | A1 | 2/2004 | Chapman et al. |
| 2004/0139477 | A1 | 7/2004 | Russell et al. |
| 2005/0013267 | A1 | 1/2005 | An |
| 2005/0053015 | A1 | 3/2005 | Jin et al. |
| 2005/0058089 | A1* | 3/2005 | Vijayan et al. ................ 370/312 |
| 2005/0141451 | A1 | 6/2005 | Yoon et al. |
| 2005/0152394 | A1 | 7/2005 | Cho |
| 2006/0009229 | A1 | 1/2006 | Yuan et al. |
| 2006/0056316 | A1 | 3/2006 | Chandra et al. |
| 2006/0164969 | A1* | 7/2006 | Malik et al. .................. 370/203 |
| 2006/0203795 | A1* | 9/2006 | Welborn et al. ............... 370/345 |
| 2006/0209745 | A1* | 9/2006 | MacMullan et al. .......... 370/328 |
| 2006/0209892 | A1 | 9/2006 | MacMullan et al. |
| 2007/0230338 | A1 | 10/2007 | Shao et al. |
| 2007/0268868 | A1 | 11/2007 | Singh et al. |
| 2008/0198875 | A1 | 8/2008 | Qin et al. |
| 2009/0080366 | A1 | 3/2009 | Shao et al. |
| 2009/0232103 | A1 | 9/2009 | Kesselman et al. |
| 2009/0310574 | A1 | 12/2009 | Jeon et al. |
| 2010/0226343 | A1 | 9/2010 | Hsu et al. |

FOREIGN PATENT DOCUMENTS

| | | |
|---|---|---|
| EP | 1 484 867 A2 | 12/2004 |
| JP | 2000236338 A | 8/2000 |
| JP | 2003274446 A | 9/2003 |
| JP | 2004128654 A | 4/2004 |
| JP | 2005027298 A | 1/2005 |
| JP | 2007019604 A | 1/2007 |
| JP | 2008512040 | 4/2008 |
| WO | 2005089358 A2 | 9/2005 |
| WO | 2006025773 A1 | 3/2006 |
| WO | WO 2007111474 A1 | 10/2007 |

OTHER PUBLICATIONS

Hitachi, Ltd. et al., High-Definition Multimedia Interface (HDMI) Specification Version 1.2, Aug. 22, 2005, pp. 1-214.

802.15.3™ IEEE Standard for Information Technology—Telecommunications and information exchange between systems—Local and metropolitan area networks—Specific requirements, Part 15.3: Wireless Medium Access Control (MAC) and Physical Layer (PHY) Specifications for high Rate Wireless Personal Area Networks (WPANs), IEEE Std 802.15.3-2003, IEEE Computer Society, Sep. 29, 2003, 324 pages.

Zhu, H. and Cao, G., "A Power-Aware and QoS-Aware Service Model on Wireless Networks", INFOCOM 2004, 23rd Annual Joint Conference of the IEEE Computer and Communication Societies, Mar. 2004, pp. 1393-1403, vol. 2.

Van Veen, B.; and Buckley, K., "Beamforming: A Versatile Approach to Spatial Filtering," IEEE ASSP Magazine, vol. 5, pp. 4-24, Apr. 1988.

IEEE P802.11e/D13.0, Part 11: Wireless LAN Medium Access Control (MAC) and Physical Layer (PHY) Specifications: "Amendment: Medium Access Control (MAC) Quality of Service (QoS) Enhancements," LAN/MAN Committee of the IEEE Computer Society, Jan. 2005, pp. 1-198 , New York, NY, United States.

IEEE Wireless LAN Edition, "A Compilation Based on IEEE Std 802.11—1999 (R2003) and its Amendments," IEEE Standards Information Network, Sep. 19, 2003, IEEE Press, pp. 1-706, New York, New York, United States.

Stephens, A. et al., "Joint Proposal: High Throughput Extension to the 802.11 Standard: MAC," IEEE 802.11-05/1095r2, IEEE Press, Nov. 16, 2005, pp. 1-37, New York, NY, United States.

International Search Report and Written Opinion for International Application No. PCT/KR2007/001509 from Korean Intellectual Property Office dated Jun. 27, 2007, pp. 1-10.

U.S. Non-final Office Action for U.S. Appl. No. 11/726,779 mailed Mar. 30, 2011.

European Search Report dated Mar. 12, 2012 for European Patent Application No. 07746593.8 from European Patent Office, pp. 1-6, Munich, Germany.

Japanese Office Action dated Mar. 29, 2012 for Japanese Patent Application No. 2010-503951 from Japanese Patent Office, pp. 1-9, Tokyo, Japan (English-language translation attached, pp. 1-5).

European Search Report dated Feb. 27, 2012 for European Application No. EP 07746593, pp. 1-7, European Patent Office, Munich, Germany.

Kim, J.E. et al., "An Improvement of Channel Efficiency for IEEE 802.15.3 High Rate WPAN", Proceedings of the 2006 International Conference on Advanced Communication Technology (ICACT), Feb. 20, 2006, pp. 1677-1680, vol. 3, IEEE, United States.

Rangnekar, A. et al., "QoS Aware Multi-Channel Scheduling for IEEE 802.15.3 Networks",Feb. 1, 2006, pp. 47-62, vol. 11, No. 1, Kluwer Academic, United States.

Gilb, J.P.K. et al., "Proposal for Wireless support of uncompressed HD audio and video using 60 GHz unlicensed band", Project: IEEE P802.15 Working Group for Wireless Personal Area Networks (WPANs), Mar. 13, 2007, pp. 1-15, IEEE, United States.

Chinese Office Action dated Dec. 31, 2011, for Chinese Patent Application 200780052615.7 from China Intellectual Property Office, pp. 1-24, China Intellectual Property Office, People's Republic of China (Machine-generated English-language translation attached, pp. 1-10).

U.S. Notice of Allowance for U.S. Appl. No. 11/726,779 mailed Jan. 20, 2012.

U.S. Non-final Office Action for U.S. Appl. No. 11/726,779 mailed Oct. 20, 2010.

Chinese Notice of Allowance dated Feb. 25, 2011 for Chinese Patent Application 200780008339.4 from the China Intellectual Property Office, pp. 1-2, China Intellectual Property Office, People's Republic of China (English Translation attached, pp. 1-2).

Chinese Office Action dated Aug. 30, 2010 for Chinese Patent Application 200780008339.4 from the China Intellectual Property Office, pp. 1-3, China Intellectual Property Office, People's Republic of China (A machine-generated English Translation attached, pp. 1-6).

U.S. Final Office Action for U.S. Appl. No. 11/726,779 mailed Oct. 11, 2011.

U.S. Non-final Office Action for U.S. Appl. No. 11/903,783 mailed Nov. 24, 2010.

U.S. Non-final Office Action for U.S. Appl. No. 11/903,783 mailed May 12, 2011.

U.S. Final Office Action for U.S. Appl. No. 11/903,783 mailed Oct. 25, 2011.

Japanese Office Action dated May 8, 2012 for Japanese Patent Application No. 2009-502674 from Japanese Patent Office, pp. 1-4, Tokyo, Japan (Machine-generated English-language translation attached, pp. 1-2).

* cited by examiner

METHOD AND SYSTEM FOR CHANNEL TIME ALLOCATION AND ACCESS CONTROL IN WIRELESS NETWORK FOR HIGH-DEFINITION VIDEO TRANSMISSION

RELATED APPLICATION

This application claims priority from U.S. Provisional Patent Application Ser. No. 60/793,451, filed on Apr. 20, 2006, incorporated herein by reference.

FIELD OF THE INVENTION

The present invention relates generally to communication networks and in particular, to channel time allocation for communication in wireless networks.

BACKGROUND OF THE INVENTION

With the proliferation of high quality video, an increasing number of electronics devices (e.g., consumer electronics devices) utilize high definition (HD) video which can require more than 1 gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area networks (WLANs) and similar technologies can suffer interference issues when several devices which do not have the bandwidth to carry the uncompressed HD signal, and do not provide an air interface to transmit uncompressed video over a 60 GHz band are connected.

The IEEE 802.15.3 standard specifies channel access methods for transmission of audio/visual information over WLANs. However, in the IEEE 802.15.3 standard, channel access control is complicated and is only for access to a single channel. In addition, in the IEEE 802.15.3 standard, channel time allocation description carried in a beacon is quite large because every allocated time block is described independently. There is, therefore, a need for a method and system for channel control in wireless communication networks which address the above shortcomings.

BRIEF SUMMARY OF THE INVENTION

The present invention provides a method and system for channel time allocation and access control in wireless communication networks. In one embodiment, the channel time is divided into channel time blocks (CTBs), including one or more reserved CTBs and one or more unreserved CTBs. Schedules are implemented wherein one or more periodic, equal-sized CTBs are reserved for isochronous streams. Packets are communicated over the channel during the reserved CTBs. Dynamic CTB extension and truncation are also provided to allow flexible channel time allocation.

In another embodiment, the present invention provides a coordinator for managing communication of information over one or more wireless channels in a network, comprising: a controller configured for receiving a bandwidth request from a source wireless station for transmission of information, and determining channel bandwidth availability; and a scheduler configured for allocating available channel bandwidth by dividing channel time into one or more superframes, each superframe including one or more schedules comprising one or more channel time blocks (CTBs) that include one or more reserved CTBs for communication of packets of information over a channel.

In another embodiment, the present invention provides a wireless station for communication of information over one or more wireless channels in a network, comprising: a controller module configured for requesting reservation of available channel bandwidth from a coordinator for transmission of information; and a communication module configured for communication of packets of information over a channel according to one or more schedules provided by the coordinator, wherein each schedule allocates available channel bandwidth by dividing channel time into one or more superframes, each superframe including one or more schedules comprising one or more channel time blocks (CTBs) that include one or more reserved CTBs for communication of packets of information over the channel.

These and other features, aspects and advantages of the present invention will become understood with reference to the following description, appended claims and accompanying figures.

DETAILED DESCRIPTION OF THE INVENTION

The present invention provides a method and system for channel time allocation and access control process in wireless networks. In one embodiment, the channel time is divided into channel time blocks (CTBs), including one or more reserved CTBs and one or more unreserved CTBs. Schedules are implemented, wherein one or more periodical, equal-sized CTBs are reserved for isochronous streams to meet quality of service (QoS) and transmission efficiency requirements. Dynamic CTB extension and truncation are also provided to allow flexible channel time allocation.

Figure 1:
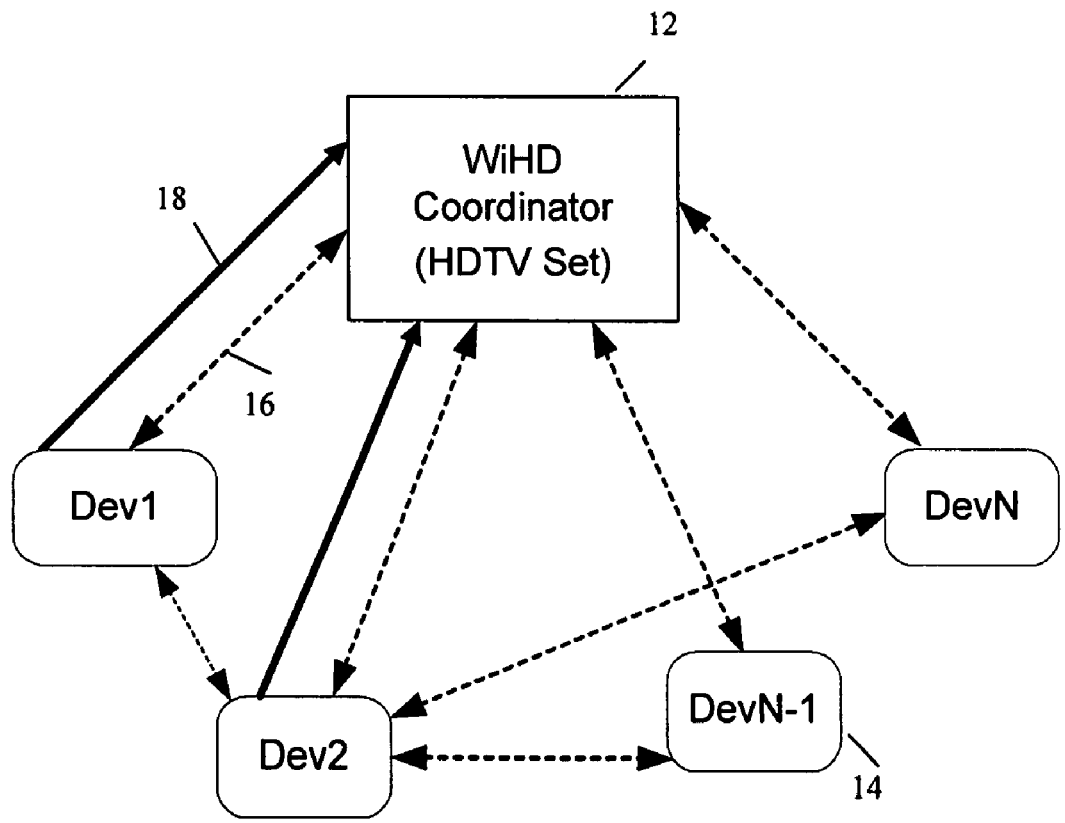
FIG. 1 shows a functional block diagram of a wireless network, implementing video transmission between wireless stations, according to an embodiment of the present invention.

FIG. 1 shows a functional block diagram of a wireless network 10 including wireless communication stations 12 and 14, implementing video and data communication according to an embodiment of the present invention. The wireless communication station 12 comprises a wireless HD (WiHD) coordinator, and the multiple wireless communication stations 14 comprise wireless stations (e.g., devices Dev1, ..., DevN). The coordinator 12 and the stations 14 utilize a low-rate (LR) channel 16 (shown by dashed lines in FIG. 1) and a high-rate (HR) channel 18 (shown by heavy solid lines in FIG. 1), for communication therebetween.

In this example, the coordinator 12 is a sink of video and/or audio data implemented, for example, in a HDTV set in a home wireless network environment which is a type of WLAN. Each station 14 comprises a device that can be a source of uncompressed video or audio. Examples of each station 14 can be a set-top box, a DVD player, etc. A station 14 can also be an audio sink. In another example, the coordinator 12 can be a source of a video stream. In yet another example, the coordinator provides channel coordination functions for wireless communication between a sink station and a source station. The coordinator provides channel access management functions according to the present invention, which can also be implemented in a stand-alone device, in a sink device and/or in a source device.

The coordinator 12 uses a LR channel 16 and a HR channel 18, for communication with the stations 14. Each station 14 uses the LR channel 16 for communications with other stations 14. The HR channel 18 only supports single direction unicast transmission with, e.g., multi-Gb/s bandwidth to support uncompressed HD video transmission. The LR channel 16 can support bi-directional transmission, e.g., with at most 20 megabits per second (Mbps) throughput. The LR channel 16 is mainly used to transmit control frames such as acknowledgement (ACK) frames.

In many wireless communication systems, a frame structure is used for data transmission between wireless stations such as a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such a source addresses (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

Figure 2:
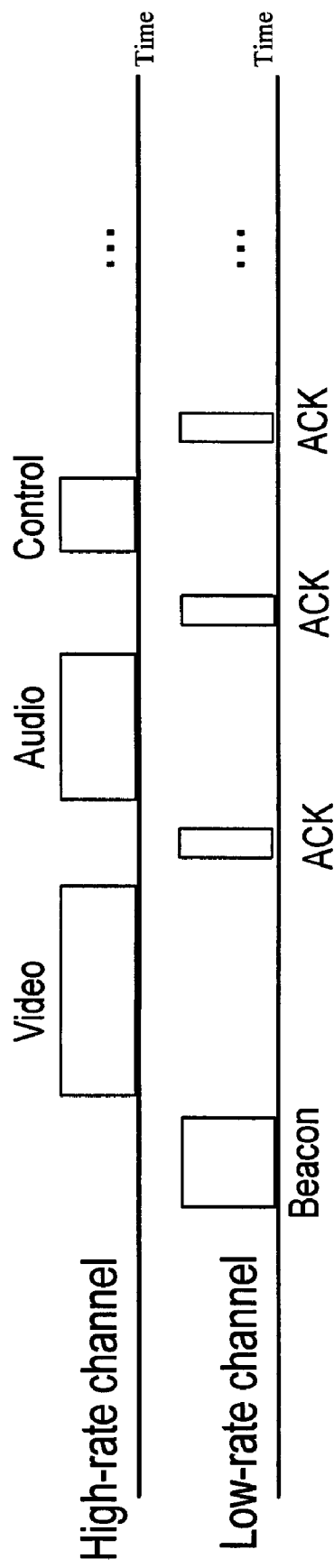
FIG. 2 shows an example of a timing diagram for a Time Division Duplex (TDD) scheduling applied to low-rate and high-rate wireless communication channels in FIG. 1.

As shown by the example timing diagram in FIG. 2 according to the present invention, a Time Division Duplex (TDD) scheduling is applied to the LR and HR channels 16 and 18, whereby at any one time the LR and HR channels 16 and 18 cannot be used in parallel for transmission. In the example of FIG. 2, beacon and ACK packets/frames are transmitted over the LR channel 16 in between transmission of packets of data (e.g., video, audio and control message) information over the HR channel 18.

There are two approaches for a wireless station (STA) to access a shared wireless communication channel. One approach is a contention-free arbitration (CF) method, and the other is a contention-based arbitration (CB) method. The CF access method utilizes a point coordinator function (PCF) to control access to the channel. When a PCF is established, the PCF polls registered STAs for communications and provides channel access to the STAs based on polling results. The CB access method utilizes a random back-off period to provide fairness in accessing the channel. In the CB period, a STA monitors the channel, and if the channel has been silent for a pre-defined period of time, the STA waits a certain period of time and if the channel remains silent, the STA transmits on the channel.

According to the present invention, in a contention-free period, instead of PCF polls, time scheduling is utilized, wherein beacons provide information about scheduled channel time blocks. Further, a broadcasting scheme is applied based on a superframe structure 20 shown by example in FIGS. 3A-B. Beacons 22 divide the channel time into multiple superframes 20. In each superframe 20 there are contention periods 24 and contention-free periods (CFPs) 28. In each CFP 28 there are one or more schedules 30.

Figure 3A:
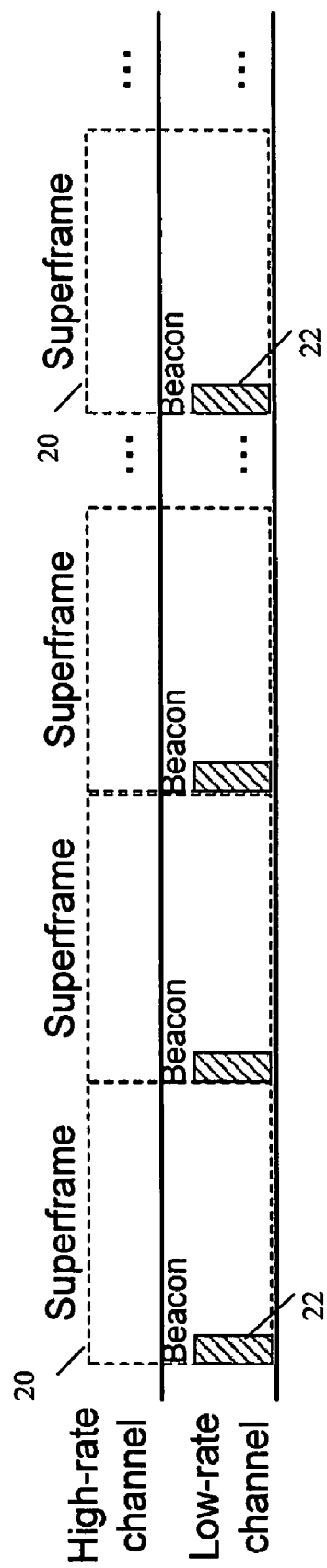
FIG. 3A shows example superframe structures according to the present invention.
Figure 3B:
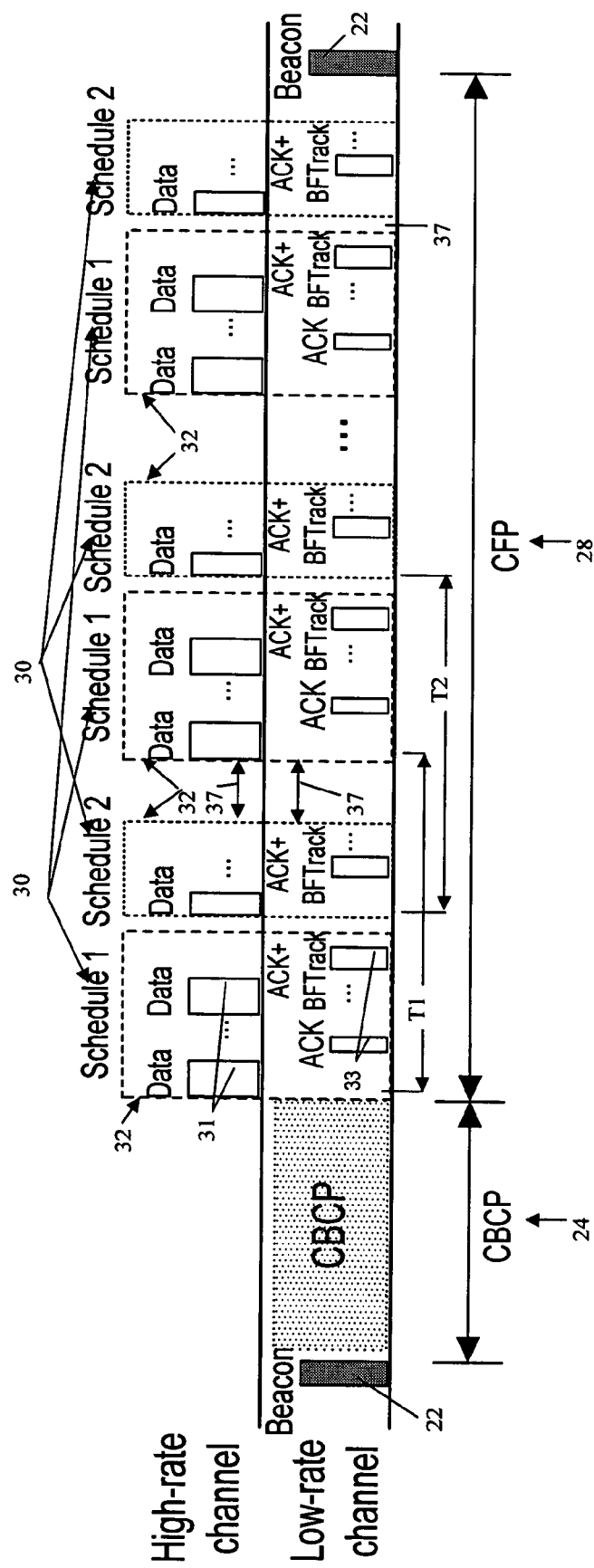
FIG. 3B shows example details of a superframe structure, according to the present invention.

FIG. 3A shows a sequence of superframes 20, and FIG. 3B shows details of a superframe 20 for the LR and HR channels including multiple schedules 30. Each schedule 30 includes one or more periodic reserved CTBs 32 which is reserved for transmission of isochronous data streams. The schedules 30 represent reserved CTBs 32, and the time periods between the schedules 30 are unreserved CTBs 37. As such, each superframe 20 includes two CTB categories: reserved CTBs 32 and unreserved CTBs 37. Such a superframe 20 is useful for channel access control using reserved CTBs for transmission of, e.g., uncompressed HD video over wireless channels (e.g., the HR channel 18 and the LR channel 16).

A superframe 20 can include a contention-based control period (CBCP) 24 and a CFP 28, wherein the CFP 28 includes multiple reserved channel time blocks (RCTBs) 32 and/or unreserved channel time blocks (UCTBs) 37. Each beacon frame ("beacon") 22 is used to set timing allocations and to communicate management information for the network 10 (e.g., WiHD sub-net). It is assumed that beacon signals are always transmitted omni-directionally. The CBCP 24, if present, is used to communicate control and management commands on the LR channel 16. No information can be transmitted on the HR channel 18 within the CBCP period 24. There can also be a beam-search period (BSP) between the CBCP 24 and the CFP 28 to search transmission beams and adjust beamforming parameters (e.g., every 1~2 seconds a BSP can appear in the corresponding superframe 20). One or more CTBs 32 in a CFP 28 can be reserved, e.g., by one or more stations 14 for communication of commands, isochronous streams and asynchronous data connections. A CFP is a contention-free period within one superframe, wherein one schedule can cross multiple superframes. Usually at each superframe a schedule has CTBs at the same position of the superframe.

The reserved CTBs 32 are used to transmit commands, isochronous streams and asynchronous data connections. Each reserved CTB 32 can be used for transmitting a single or multiple data frames, wherein the schedules 30 organize the reserved CTBs 32. In each superframe 20, a schedule 30 can have one reserved CTB 32 (e.g., for pre-scheduled beam-searching or bandwidth reservation signaling) or multiple periodic reserved CTBs 32 (e.g., for an isochronous stream). Unreserved CTBs 37 are typically used to transmit Consumer Electronic Commands (CECs) and MAC control and management commands on the LR channel. No beamforming transmission is allowed within the unreserved CTBs 37. In FIG. 3B, a superframe 20 includes a CFP 28 with two schedules 30 (i.e., Schedule1 and Schedule2). Each schedule 30 includes multiple reserved CTBs 32, wherein a duration of a schedule is divided between multiple CTB time blocks 32. Each reserved CTB 32 is allocated to a portion of the corresponding schedule, wherein T1 indicates the time period between the start of each Schedule1 interval, and T2 indicates the time period between the start of each Schedule2 interval.

A beacon 22 is transmitted by the coordinator 12 periodically to identify the start of every superframe 20. Configuration of the superframe 20 and other parameters are included in the beacon 22. For example, the beacon 22 indicates the start time and length of the CBCP period(s) 24 and the CFP period(s) 28. In addition, the beacon 22 dictates the allocation of the CTBs in the CFP 28 to different stations 14 and streams. Since the stations 14 can implicitly know the timing information of the unreserved CTBs 37, a beacon 22 need not carry timing information for unreserved CTBs 37.

For reservation-based time allocation, data transmissions using beamforming must be reserved in advance. A station 14 requests channel bandwidth from the coordinator 12 for the transmission of both isochronous streams and asynchronous data in packets 31. If there is sufficient bandwidth available, the coordinator 12 allocates a schedule 30 for the requesting station 14. A schedule 30 can include one or more reserved CTBs 32 in each superframe 20, or one reserved CTB 32 in every N superframes 20. Typically, an isochronous stream is transmitted within one schedule 30 for each superframe 20. However, it is also possible to allocate multiple schedules 30 for one isochronous or asynchronous stream. Multiple streams belonging to the same device can also be transmitted within one schedule 30. Each packet 31 transmitted from a source to a destination (i.e., a sink) in the network has a corresponding ACK packet 33 sent back from that destination. Each data packet 31 and corresponding ACK packet 33 form a data-ACK pair. A CTB 32 can include a single data-ACK pair or multiple data-ACK pairs.

A schedule 30 can be used for periodical beam searching in which one reserved CTB 32 appears every 1~2 seconds. Beam-searching is used to search for transmission beams and adjust beamforming parameters. Periodical beam-searching can also be performed within the unreserved CTBs 37. In addition to periodical beam-searching, event-driven beam-searching (i.e., dynamic beam-searching) can be triggered by factors such as bad channel status. If event-driven beam-searching is to be implemented without affecting other reserved schedules, the length of any reserved CTB for a schedule ($T_{reserved\_CTB}$) plus the length of any unreserved CTBs immediately after the reserved CTB ($T_{un\_reserved\_CTB}$), should not be less than the length of a beam-searching period $T_{beam-searching}$ (e.g., 400 μs as default). As such, $T_{reserved\_CTB} + T_{un\_reserved\_CTB} \geq T_{beam-searching}$.

Figure 4A:
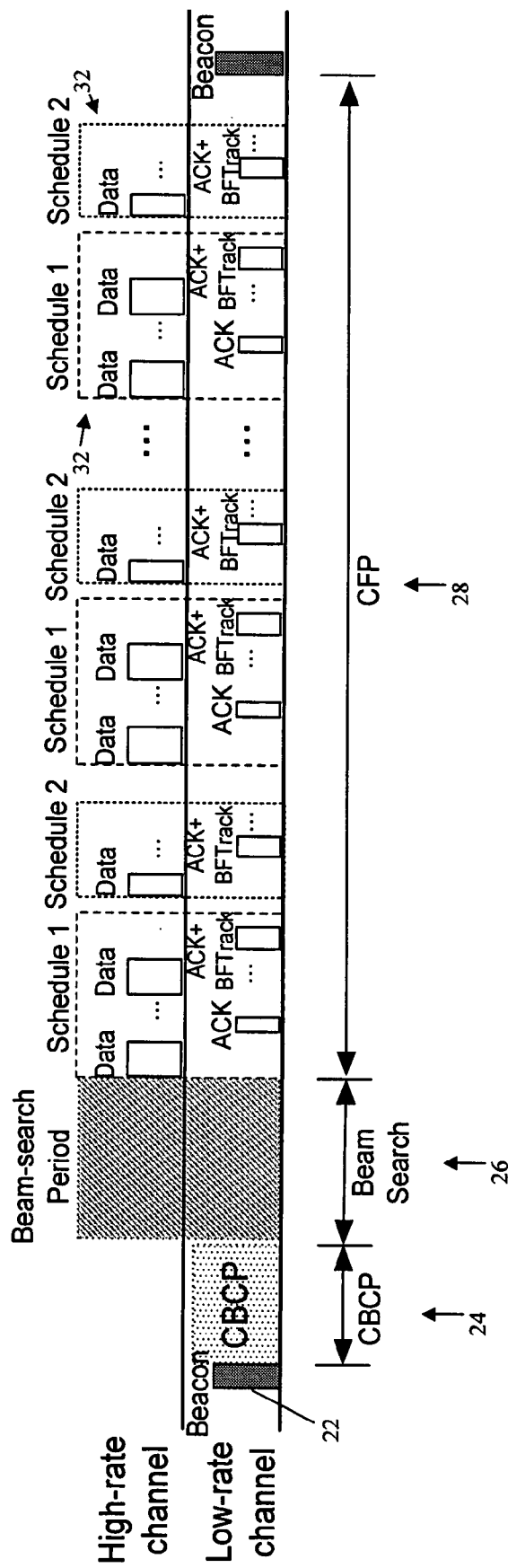
FIG. 4A shows an example superframe structure with a beam-search period, according to the present invention.
Figure 4B:
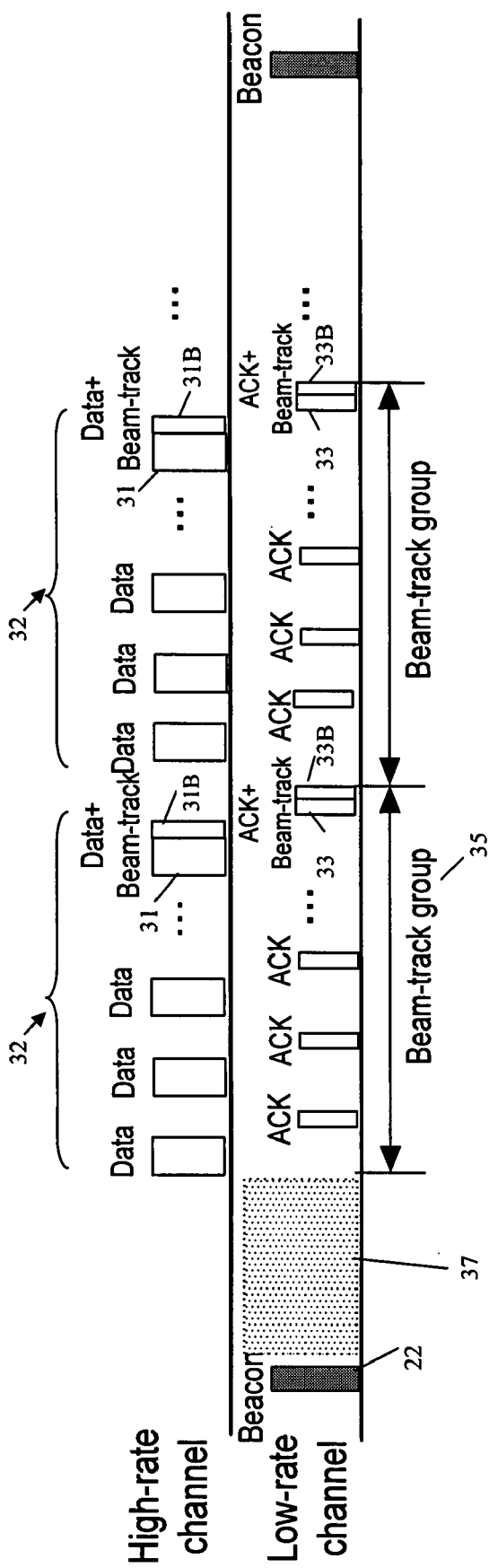
FIG. 4B shows an example superframe structure, wherein beam-tracking information is piggybacked to a data and acknowledgement packet, according to the present invention.

FIG. 4A shows an example beam-search period (BSP) 26 for beam-searching. Typically, every 1~2 seconds a BSP 26 appears in a corresponding superframe 20. In addition to beam-searching, beam-tracking information (BFTrack) is used to fine-tune the beamforming parameters at both the sender (device 14) and the receiver (coordinator 12) to maintain link quality for beamforming transmission despite dynamic changes in the environment. FIG. 4B shows an example of time allocation in a superframe 20, wherein beam-tracking information 31B is piggybacked to a data packet 31 and beam-tracking information 33B is piggybacked to a corresponding ACK packet 33, in a data-ACK pair. The piggybacking process takes place periodically, such as every 5~10 data-ACK pairs. Typically, a reserved CTB 32 is long enough to hold at least one beam-track group period 35 that includes a series of packets 31 with piggybacked beam-tracking information 31B, and corresponding ACK packets 33 with piggybacked beam-tracking information 33B.

Allocated schedules can be changed via bandwidth requests and are announced in the beacon 22 by the coordinator 12. The allocated schedules 30 can span multiple superframes 20, or be within one particular superframe. Each schedule 30 includes a series of evenly distributed reserved CTBs 32 having equal durations. The reasons for requiring even distribution of reserved CTBs 32 in a schedule 30 in a superframe 20 include:

1. Evenly distributed reserved CTBs can reduce the jitter caused by wireless transmission since data in an isochronous stream is buffered continuously.
2. Buffer size can be reduced at both the sender (i.e., a source station) and the receiver (i.e., a destination station).
3. The CFP allocation information carried in the beacon frame can be reduced since one schedule description can cover multiple reserved CTBs in a superframe 20. This is useful for WiHD applications since beacons are transmitted on the LR channel 16 where large beacon frames can introduce high communication overhead.

Figure 5:
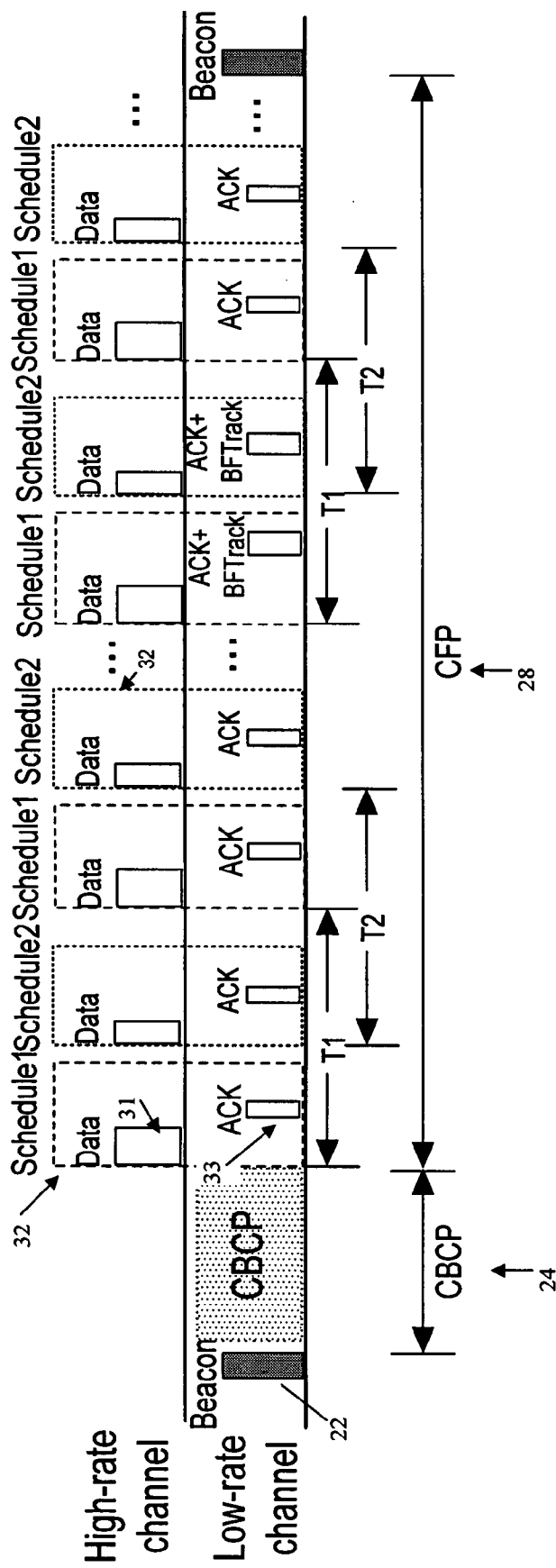
FIG. 5 shows an example superframe structure with a contention-free period (CFP) time allocation for two streams with one data packet buffer size requirement, according to the present invention.

FIG. 5 shows an example superframe structure with time allocation for two streams with one data packet buffer size requirement, according to the present invention. Specifically, FIG. 5 shows a superframe 20 with an example CFP 28 time allocation wherein two schedules 30 (i.e., Schedule1 and Schedule2) are allocated, similar to FIG. 3B. Each schedule 32 includes multiple CTBs 32. Time allocation is for two streams with one data packet buffer size requirement. For each schedule 30, only a single data-ACK pair 31 and 33 is allowed within each CTB 32, in order to minimize buffer size requirement. Therefore, for each stream, the sender sends packets to the receiver periodically using a corresponding schedule (Schedule 1 or Schedule2). A T1 indicates the time period between the start of each Schedule1 interval, and a T2 indicates the time period between the start of each Schedule2 interval.

Figure 6:
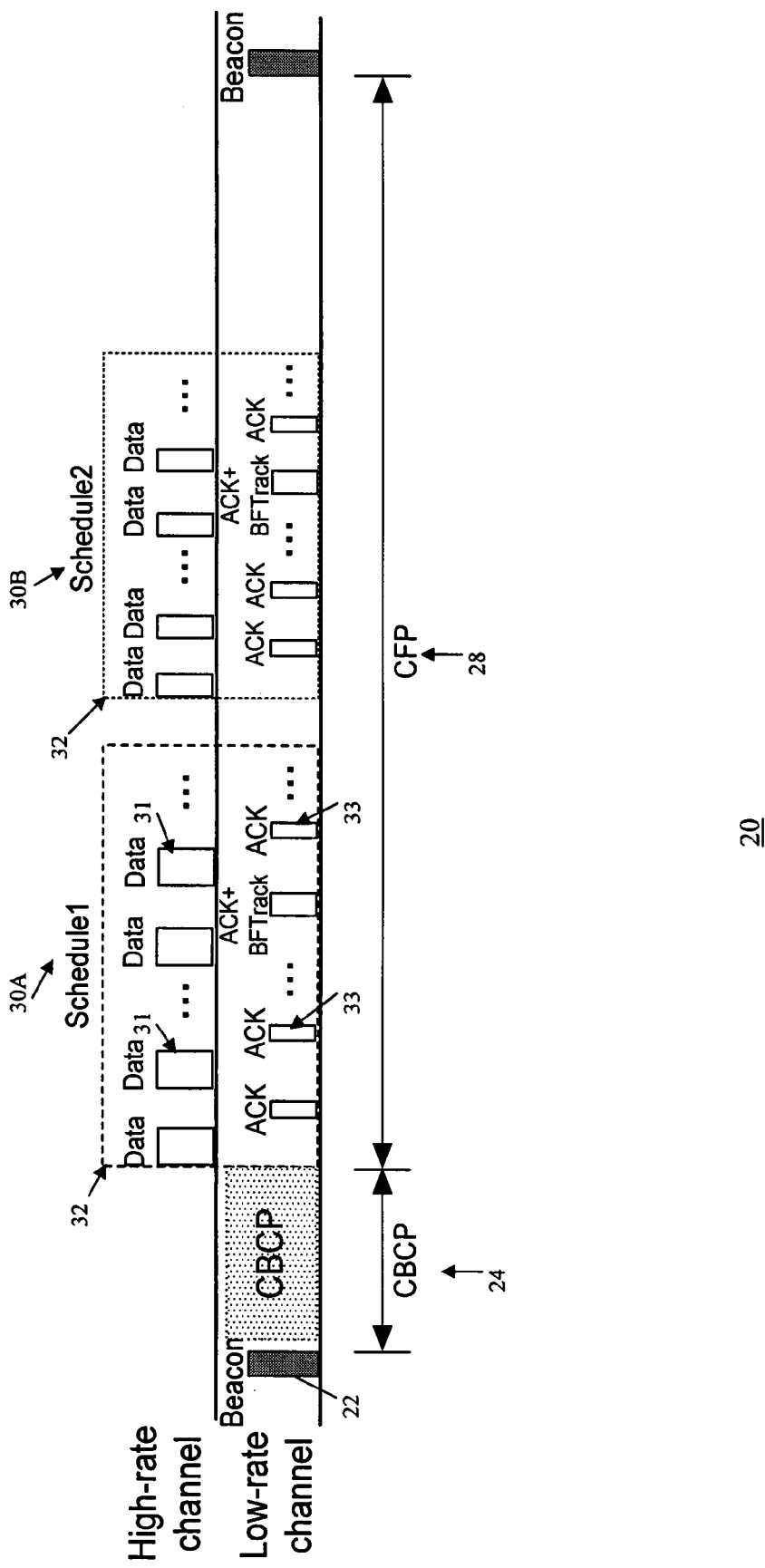
FIG. 6 shows an example superframe structure with CFP time allocation for two streams, wherein the sender and the receiver have large buffers, according to the present invention.

FIG. 6 shows an example superframe structure with CFP time allocation for two streams, wherein the sender and the receiver have large buffers, according to the present invention. Specifically, FIG. 6 shows a superframe 20 with another example CFP 28 time allocation with two schedules 30A and 30B (i.e., Schedule1 and Schedule2). Each schedule only has one reserved CTB 32 in the superframe 20 in order to minimize the switching between the two streams. Using Schedule1 or Schedule2, the sender buffers all packets that should be transmitted in one superframe, and transmits the packets to the receiver in a burst fashion within one CTB 32.

The unreserved CTBs 37 (FIGS. 3B, 4B) are primarily used for the transmission of control and management packets between a station 14 and the coordinator 12, and also between the stations 14 if direct link support (DLS) is allowed. During an unreserved CTB 37, only the LR channel 16, operating in an omni-direction mode, can be utilized. No information can be transmitted on the HR channel 18 during an unreserved CTB 37. Different contention-based medium access mechanisms, such as a carrier sense multiple access (CSMA) scheme or a slotted Aloha scheme can be used during an unreserved CTB 37.

Timing information for reserved schedules is placed in an information element (IE) in each beacon frame 22 (Reserved Schedule). Table 1 shows an example Reserved Schedule IE format according to the present invention. Table 2 shows a Schedule item format according to the present invention.

TABLE 1

Reserved Schedule Information Element Format

| Octets: 11 | ... | 11 | 11 | 1 | 1 |
|---|---|---|---|---|---|
| Schedule item n | ... | Schedule item 2 | Schedule item 1 | Length = (10 * n) | Element ID |

TABLE 2

Schedule Item Format

| Octets: 2 | 1 | 2 | 2 | 1 | 1 | 1 | 1 |
|---|---|---|---|---|---|---|---|
| Schedule period | Number of time blocks | Duration of time block | Schedule start offset | Stream index | Channel ID | SrcID | DestID |

In Tables 1 and 2, the DestID indicates the destination station (receiver), such as the coordinator 12, which the source station (sender), such as the station 14, may send packets. The SrcID indicates the station to which the channel time is being allocated. The channel ID indicates the channel to which channel bandwidth is being allocated. The stream index field indicates the stream corresponding to the bandwidth allocation. The schedule start offset field indicates the start time of the schedule. The value in the schedule start offset field is the time offset from the start of the beacon, as described. The resolution of the schedule start offset is 1 µs, so the valid range is [0-20000] µs. The duration of time block indicates the length of each CTB time block within the schedule. The resolution of duration of time block is 1 µs, wherein the valid range is [0-20000] µs. The number of time blocks indicates the quantity of time blocks within the schedule for one superframe. The range of the number of time blocks is [0-255] µs. The schedule period indicates the duration between two consecutive CTB time blocks 32 belonging to the same schedule 30 (e.g., FIG. 5).

The bandwidth request command is used to request, modify or terminate channel time allocations for both isochronous and asynchronous data traffic. Table 3 shows an example bandwidth request commands format, according to the present invention.

TABLE 3

Bandwidth Request Command Format

| Octets: 9 | ... | 9 | 9 | 1 | 1 |
|---|---|---|---|---|---|
| Bandwidth request item m | ... | Bandwidth request item 2 | Bandwidth request item 1 | Length (sum of m bandwidth request items) | Command type |

Each bandwidth request item corresponds to a schedule item. Table 4 shows an example bandwidth request format according to the present invention.

TABLE 4

Bandwidth Request Item Format

| Octets: 2 | 1 | 2 | 1 | 1 | 1 | 1 |
|---|---|---|---|---|---|---|
| Minimal schedule period | Number of time blocks | Duration of time block | Stream index | Stream request ID | Channel ID | DestID |

In Tables 3 and 4, the DestID indicates the device to which the source device may send packets. The channel ID indicates the device to which channel bandwidth is being allocated. The stream request ID field is used to uniquely identify a device's request before it receives a stream index from the coordinator. If the bandwidth request is for a new isochronous stream, then the stream request ID is a non-zero identifier generated by the originating device that is unique among the device's channel bandwidth requests. The stream request ID remains constant during the entire frame exchange sequence for establishing a new stream. If the bandwidth request is to modify or terminate an existing stream, or the request is for an asynchronous allocation, the stream request ID is set to zero and is ignored on reception. The stream index indicates the stream index assigned by the coordinator. Where the device is requesting the creation of an isochronous stream, the stream index is set to the unassigned stream value by the originating device. Where the device is requesting the reservation or termination of an asynchronous channel time, the stream index is set to the asynchronous stream value. When the stream index is other than the unassigned stream index or asynchronous stream index value, the bandwidth request item is a request to modify or terminate an existing schedule. The duration of time block indicates the length of each time block within the schedule. The resolution of the duration of time block is 1 µs, and the valid range is [0-20000] µs. The number of time blocks indicates the number of time blocks within the schedule for one superframe. The range for the number of time blocks is [0-255] µs. The minimal schedule period indicates the minimal allowed duration between two consecutive time blocks.

The resolution of the minimal schedule period is 1 μs, and the valid range is [0-20000] μs. If the minimal schedule period is set to 0, this indicates that the schedule is for a sub-rate allocation.

A bandwidth response command is used by the coordinator 12 to respond to a bandwidth request, to modify or terminate resource allocations for both isochronous and asynchronous data traffic. Table 5 shows an example format for the bandwidth response command according to the present invention.

TABLE 5

| Bandwidth Response Command Format | | | | |
|---|---|---|---|---|
| Octets: 10 | ... 10 | 10 | 1 | 1 |
| Bandwidth request item m | ... Bandwidth response item 2 | Bandwidth response item 1 | Length (sum of m bandwidth response items) | Command type |

The bandwidth response item information in Table 5 has a format that is shown by example in Table 6 below.

TABLE 6

| Bandwidth Response Item Format | | |
|---|---|---|
| Octets: 1 | 1 | 1 |
| Reason code | Stream index | Stream request ID |

In Table 6, the reason code indicates whether the bandwidth request is granted. If not, it indicates the concrete reason, wherein "0" means the bandwidth is successfully allocated.

Further according to the present invention, a dynamic CTB extension is implemented to provide flexible channel time allocation. During a reserved CTB 32, if more channel time is required immediately after a current reserved CTB (e.g., for retransmission of packets, for event-driven beam-searching), then a unreserved CTB 37 (if available) following the current reserved CTB 32, can be used as an extension of the current reserved CTB 32. In one implementation, if the current reserved CTB 32 is used for data transmission between the coordinator 12 and a station 14 over the HR channel 18, the coordinator 12 broadcasts a CTB extension announcement command over the LR channel 16. Upon receiving the CTB extension announcement command from the coordinator 12, the stations 14 that are not involved in the current reserved CTB 32, refrain from contending the HR channel 18 during the CTB extension period.

If the current reserved CTB 32 is utilized for direct link data transmission between two stations 14, then the originator of the direct link transmission sends a CTB extension request command to the coordinator 12 if there is an unreserved CTB 37 available following the current reserved CTB 32. After receiving the CTB extension request command, the coordinator 12 broadcasts a CTB extension announcement command over the LR channel 16. Upon receiving the CTB extension announcement command from the coordinator 12, the stations 14 that are not involved in the current reserved CTB 32, refrain from contending the HR channel during the CTB extension period. The commands for CTB extension requests and CTB extension announcements can be piggybacked with other frames, such as ACK packets 33 to improve channel utilization efficiency.

Figure 7:
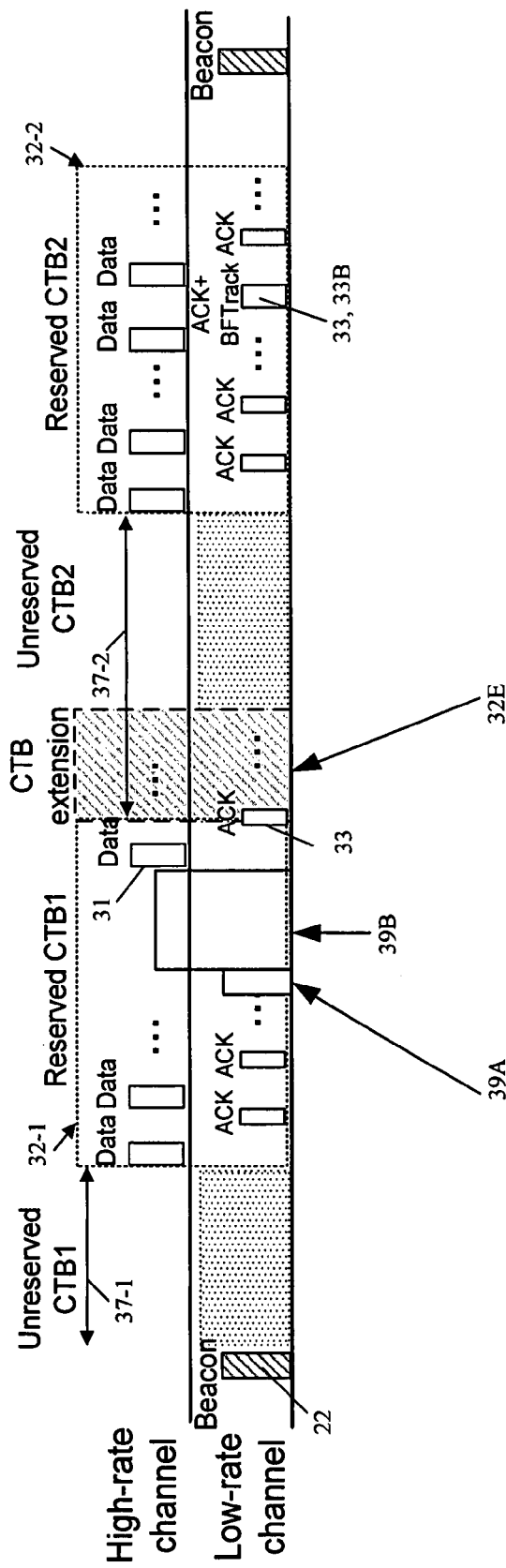
FIG. 7 shows an example of event-driven beam-searching using dynamic channel time block extension, according to the present invention.

FIG. 7 shows an example of event-driven beam-searching using a dynamic CTB extension, according to the present invention. A sequence of CTBs in a superframe 20 include an unreserved CTB 37-1 (unreserved CTB1), a reserved CTB 32-1 (reserved CTB1), an unreserved CTB 37-2 (unreserved CTB2) and a reserved CTB 32-2 (reserved CTB2). In the CTB extension period, transmission will not use contention based access, and instead uses the same method as in a reserved CTB.

Based on channel status, the coordinator 12 determines that dynamic beam-searching period is required. Then, if the coordinator 12 determines that the remaining time within the current reserved CTB 32-1 (reserved CTB1), plus the following unreserved CTB 37-2 (unreserved CTB2) is greater than the $T_{Beamsearch}$ duration, the coordinator 12 then broadcasts a CTB extension announcement command 39A over the LR channel 16 to inform the stations 14 that a portion, or all, of the following unreserved CTB 37-2 (unreserved CTB2) is to be used as an extension 32E of the current CTB 32-1 (reserved CTB1). Then, dynamic beam-searching is performed during a period 39B in the current reserved CTB 32-1 (reserved CTB1). If the current CTB extension duration 32E allows (i.e., there is still sufficient time for normal transmission of a packet after beamsearching), normal data transmission will resume during the current CTB extension duration 32E after the beam-searching period 39B.

However, if the coordinator 12 determines that the remaining time within the current reserved CTB 32-1 (reserved CTB1), plus the following unreserved CTB 37-2 (unreserved CTB2) is less than the $T_{Beamsearch}$ duration, then beam-searching is performed at the next reserved CTB 32-2 (reserved CTB2) with a CTB extension for the same schedule.

Figure 8:
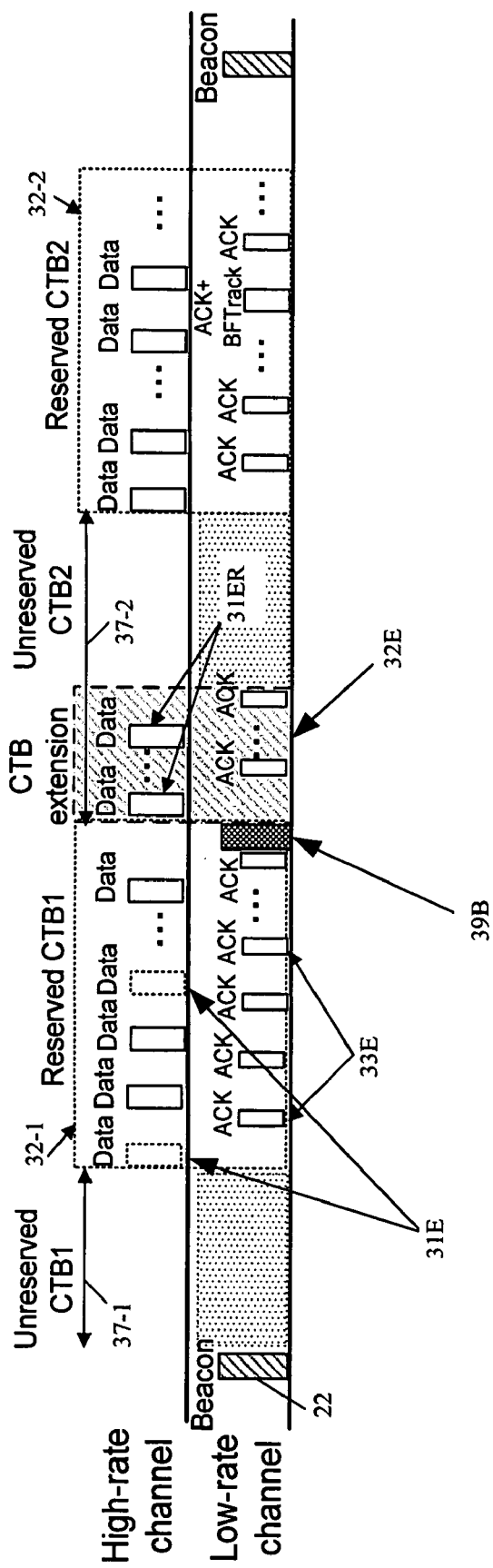
FIG. 8 shows an example of packet retransmission using dynamic channel time block extension, according to the present invention.

In another example, a dynamic CTB extension can also be utilized for packet retransmissions, as shown by example in FIG. 8. A sequence of CTBs in a superframe 20 includes an unreserved CTB 37-1 (unreserved CTB1), a reserved CTB 32-1 (reserved CTB1), an unreserved CTB 37-2 (unreserved CTB2) and a reserved CTB 32-2 (reserved CTB2).

During the reserved CTB 32-1, one or more data packets 31E are received at the receiver corrupted (as indicated by the corresponding ACK packets 33E from the receiver). As such, a corrupt packet 31E must be retransmitted from the sender. Before the expiration of the current reserved CTB 32-1, the coordinator 12 broadcasts a CTB extension announcement command 39B over the LR channel to inform the stations 14 that a portion, or all, of the following unreserved CTB 37-2 (unreserved CTB2) is to be used as an extension 32E of the current CTB 32-1 (reserved CTB1). This extends the current CTB 32-1 for transmission of all the data packets originally assigned within the extended reserved CTB 32-1, including retransmission of said packets 31E received at the received corrupted (shown as packets 31ER).

The present invention further provides a dynamic CTB truncation to release unused channel time within a reserved CTB. During a reserved CTB, after completing all necessary transmissions, the remaining channel time of the reserved CTB is released as unreserved time to free channel bandwidth. If a reserved CTB is used for data transmission between the coordinator 12 and a station 14, the coordinator 12 then broadcasts a CTB truncation announcement command over the LR channel 16 after all necessary transmissions for the reserved CTB are completed. Upon receiving the truncation announcement command, the stations 14 can begin contention for the LR channel 16 for transmitting frames over the LR channel 16.

If a reserved CTB is used for direct link data transmission between two stations 14 by a direct link transmission, then a dynamic CTB truncation involves the originator of the direct link transmission sending a CTB truncation request com mand to the coordinator 12 over the LR channel 16 after all necessary transmissions for the reserved CTB are completed. Upon receiving the CTB truncation request, the coordinator 12 broadcasts a CTB truncation announcement command over the LR channel 16. Upon receiving the truncation announcement command from the coordinator 12, the stations 14 can start to contend the LR channel 16 for transmitting data over the LR channel. The CTB truncation request commands and the CTB truncation announcement commands can be piggybacked with other packets (frames) such as ACK packets, to improve channel utilization efficiency.

The CTB extension commands are used to dynamically reserve channel time in the unreserved CTB following the current reserved CTB. Table 7 shows an example format for the CTB extension request and announcement commands, wherein the command type indicates an extension request or an announcement.

TABLE 7

Bandwidth Request Command Format

| 2 | 1 |
|---|---|
| Extension duration | Command type |

In Table 7, the extension duration indicates the length of time required or allocated immediately after the current reserved CTB. The resolution of extension duration is 1 μs, and the valid range is [0-20000] μs.

The CTB truncation commands are used to release extra reserved time in the current reserved CTB. Table 8 shows an example format for a CTB truncation request and announcement commands, wherein the command type field indicates a truncation request or announcement.

TABLE 8

Bandwidth Request Command Format

| 2 | 1 |
|---|---|
| Released duration | Command type |

In Table 8, the released duration indicates the length of time released within the current reserved CTB after all necessary transmissions. The resolution of released duration is 1 μs, and the valid range is [0-20000] μs.

The present invention further provides dynamic rescheduling with sub-beacons. The CTB extension and truncation processes conduct CTB duration adjustments for the current reserved CTB. CTB extension and CTB truncation will not affect other reserved CTBs. More generally, the coordinator 12 can broadcast a sub-beacon to reschedule other reserved CTBs to allow more flexible channel time adjustment. For example, the starting times of reserved CTBs belonging to other schedules can be shifted to allow a current reserved CTB to have more extension time. Revised timing information of different schedules is placed into sub-beacon frames to notify all stations of the revised time for the reserved CTBs.

Figure 9:
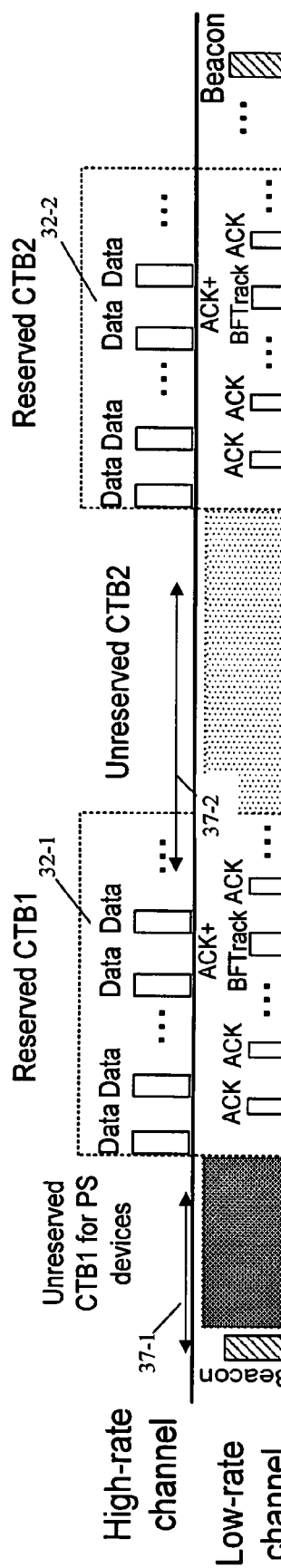
FIG. 9 shows an example of channel time block allocation for power saving devices, according to the present invention.

Normally a wireless network interface (WNI) takes a significant amount of time and energy in transition from active to sleep mode (power save) and vice-versa. The energy consumption in transition is the same as in an active state. Therefore, referring to the example superframe 20 in FIG. 9, according to the present invention in a wireless network, power saving (PS) devices contend for the unreserved periods (unreserved CTB1 37-1) immediately after a beacon 22. Since PS devices must awake to receive every beacon, or selectively a few beacons, the PS devices can remain awake to access the unreserved CTBs. This avoids additional energy consumption in sleeping, and awaking later to access a different unreserved period located somewhere else in the superframe. FIG. 9 further shows subsequent time blocks including a reserved CTB1 32-1, an unreserved CTB2 37-2 and a reserved CTB2 32-2.

The present invention simplifies the description of channel time block allocation that is carried in the beacon frames. Further, the access control process allows multiple-dimensional requirements of uncompressed video transmission and multiplexing, thereby reducing delay and jitter, allowing better support for dynamic changes of channel time allocation caused by retransmission and event-driven beam-searching and improving power saving by transmission of multiple packets of a stream in a burst when the receiving buffer size allows it. In addition, multiple unreserved channel time blocks can be easily used for transmission of high-layer control messages (such as CEC commands) and MAC control and management frames to reduce delay and jitter.

In this description, a coordinator, such as an access point (AP) is a type of a wireless communication station. Similarly, a station 14 is also a type of a wireless communication station. In one example, each wireless communication station is capable of transmitting and/or receiving over a wireless channel in a wireless communication system. Therefore, a wireless communication station herein can function as a transmitter, a sender, a receiver, an initiator and/or a responder. The coordinator can be a stand-alone device, or a component of a station such as a sink device or a source device.

Figure 10A:
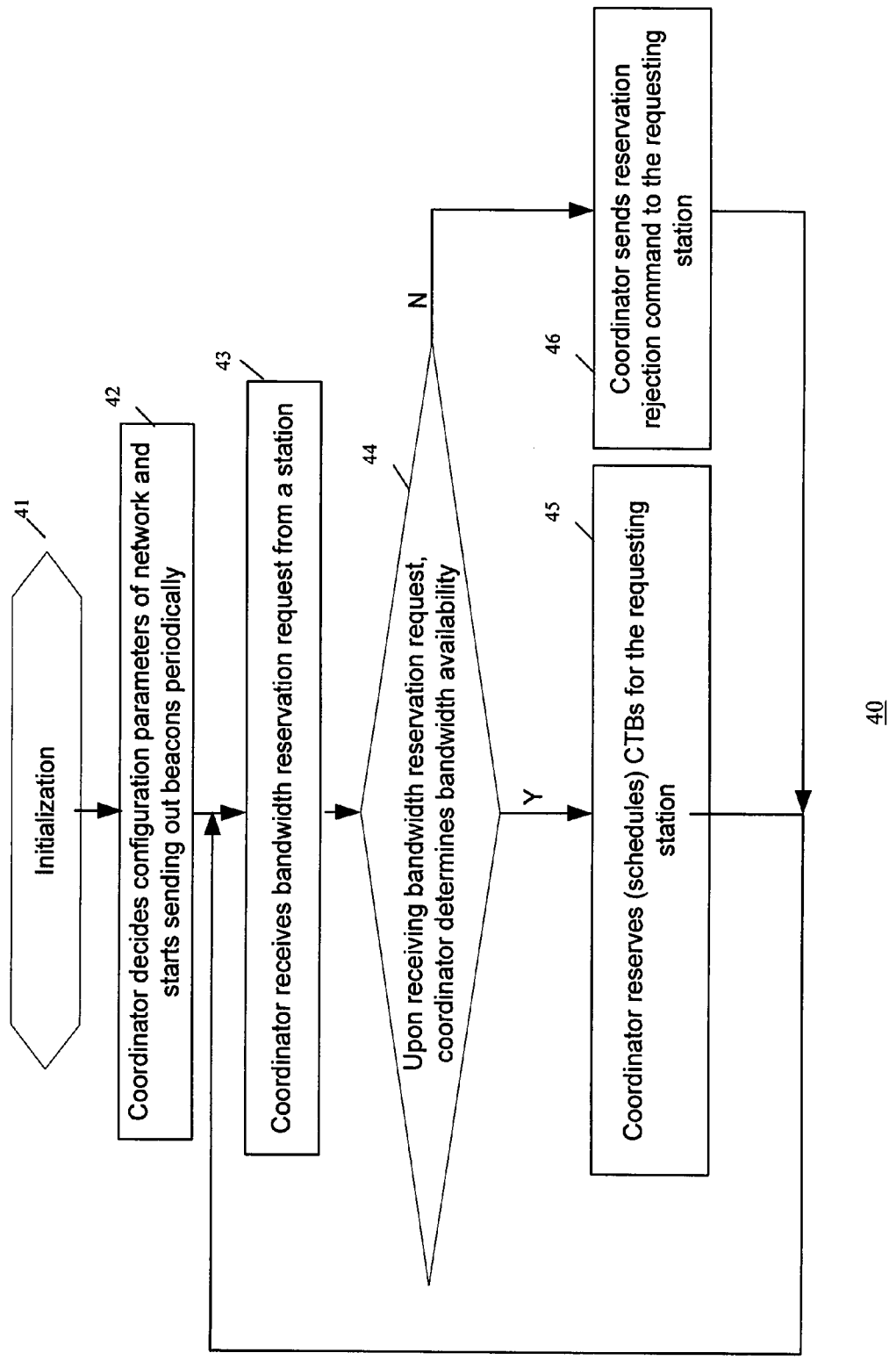
FIG. 10A shows a flowchart for example operation of a coordinator in a wireless network, according to the present invention.

FIG. 10A shows a flowchart of an example coordination process 40 implemented by the coordinator 12, according to the present invention, comprising the steps of:

Step 41: Initialize for channel coordination.

Step 42: The coordinator decides configuration parameters for the network and starts sending out beacons periodically.

Step 43: The coordinator receives a channel bandwidth reservation request from a station.

Step 44: Upon receiving a bandwidth reservation request, the coordinator determines bandwidth availability. If there is sufficient bandwidth to satisfy the reservation request, the process proceeds to step 45. If not, go to step 46.

Step 45: The coordinator reserves schedules including reserved CTBs for the requesting station. The process then proceeds back to step 43 for processing any next bandwidth reservation request.

Step 46: The coordinator sends a reservation rejection command to the requesting station. The process proceeds to step 43 for processing any next bandwidth reservation request.

Figure 10B:
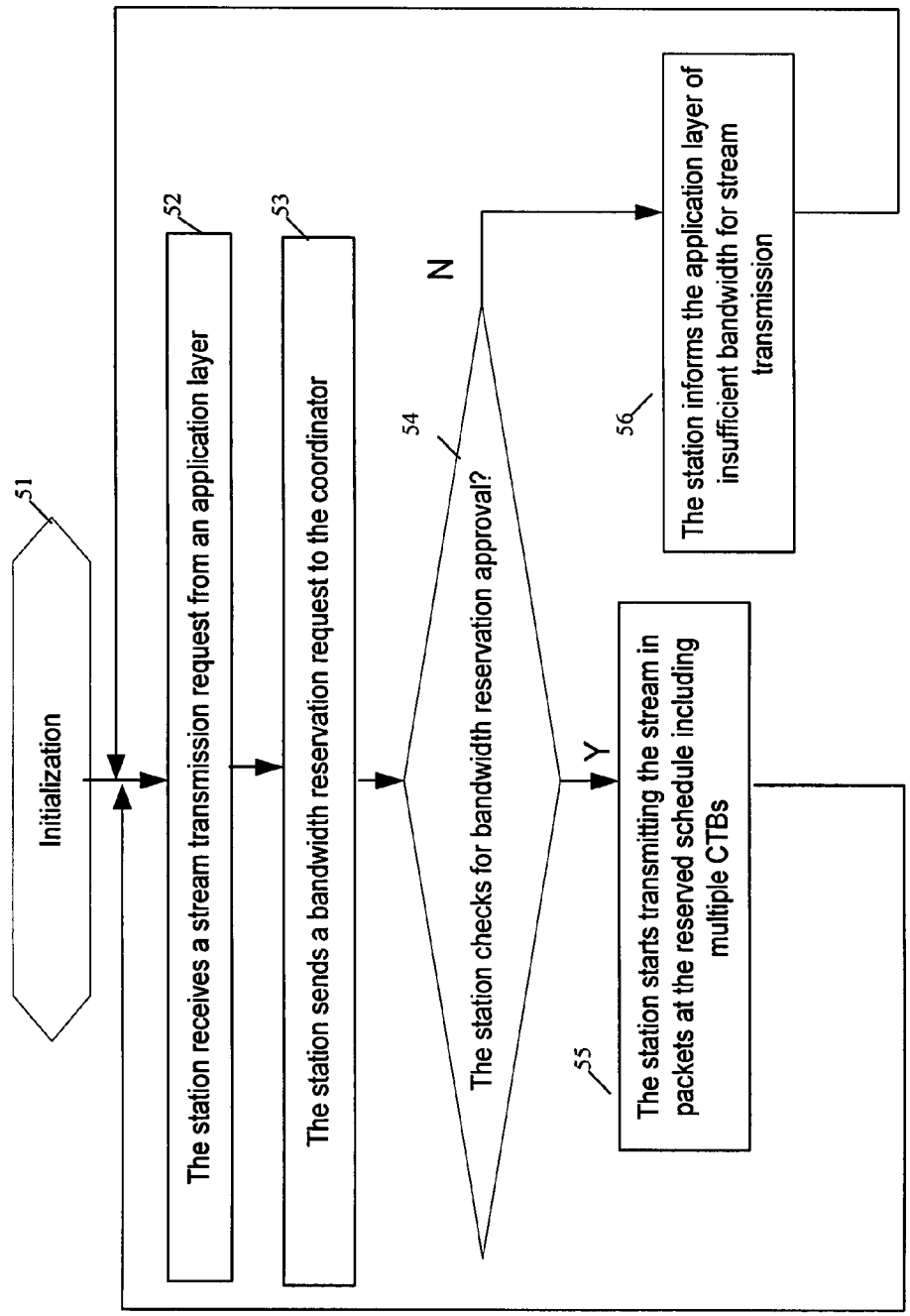
FIG. 10B shows a flowchart for example operation of a station in a wireless network, according to the present invention.

FIG. 10B shows a flowchart of an example process 50 implemented by a station 14 in a network that includes the coordinator 12 implementing the process in FIG. 10A, comprising the steps of:

Step 51: Initialize for transmission.

Step 52: The station receives a stream transmission request from an application layer.

Step 53: The station sends a channel bandwidth reservation request to the coordinator to reserve channel time for stream transmission.

Step 54: The station checks for bandwidth reservation approval from the coordinator. If approved, then the coordinator has reserved CTBs and the process proceeds to step 55. If not, the process proceeds to step 56.

Step 55: The station starts transmitting the stream as packets over the wireless channel to a receiver (e.g., coordinator 12 or another station 14) according to a reserved schedule including multiple CTBs. The process then proceeds back to step 52 for processing any next stream transmission request.

Step 56: The station informs the application layer of insufficient bandwidth for stream transmission. The process proceeds back to step 52 for processing any next bandwidth reservation request.

Figure 11:
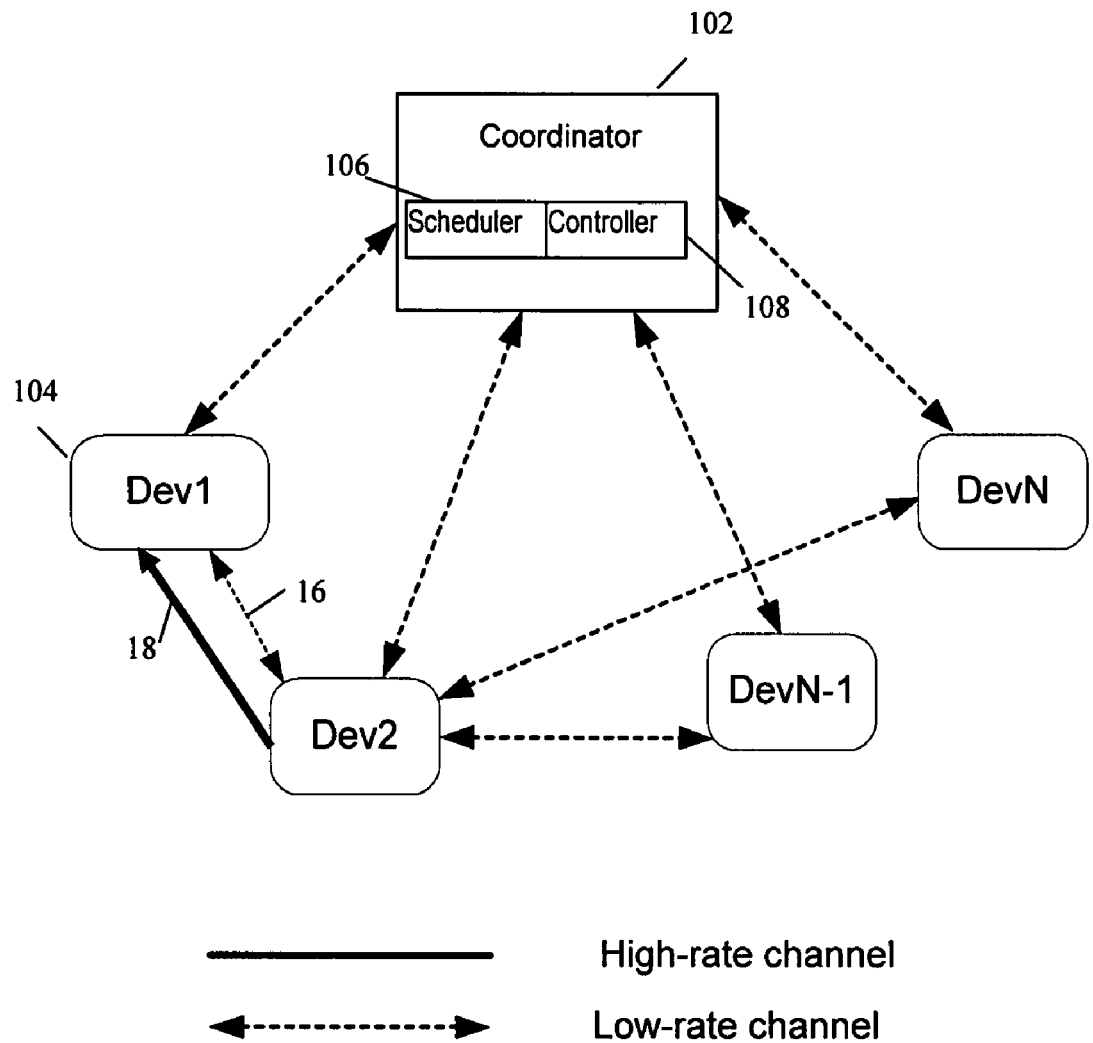
FIG. 11 shows an example functional block diagram of a sender and a receiver for video and data communication in a wireless network, according to the present invention.

FIG. 11 shows a functional block diagram of another wireless network 100 that implements uncompressed HD video transmission between wireless stations, according to an embodiment of the present invention. The network 100 includes a coordinator 102 and multiple wireless stations 104 (e.g., Dev1, . . . , DevN). The coordinator function for channel access according to the present invention is implemented by the stand-alone coordinator 102. In this example, the coordinator 102 provides channel access control for transfer of video information over the HR channel 18 between the Dev2 and Dev1 stations.

The coordinator 102 implements the scheduling and channel access functions described above. The coordinator 102 manages communication of information over the wireless channels using the superframe scheduling scheme. The coordinator 102 includes a controller 106 that receives channel bandwidth reservation requests and checks channel bandwidth availability, and a scheduler 108 that reserves available channel bandwidth as channel time blocks using the superframe scheduling scheme described above according to the present invention. The scheduler 108 periodically transmits beacons to separate channel time into multiple superframes. As described, in each superframe there are contention periods and contention-free periods. In each CFP there are one or more schedules. A superframe includes a CBCP, and a CFP including multiple RCTBs or UCTBs.

Figure 12:
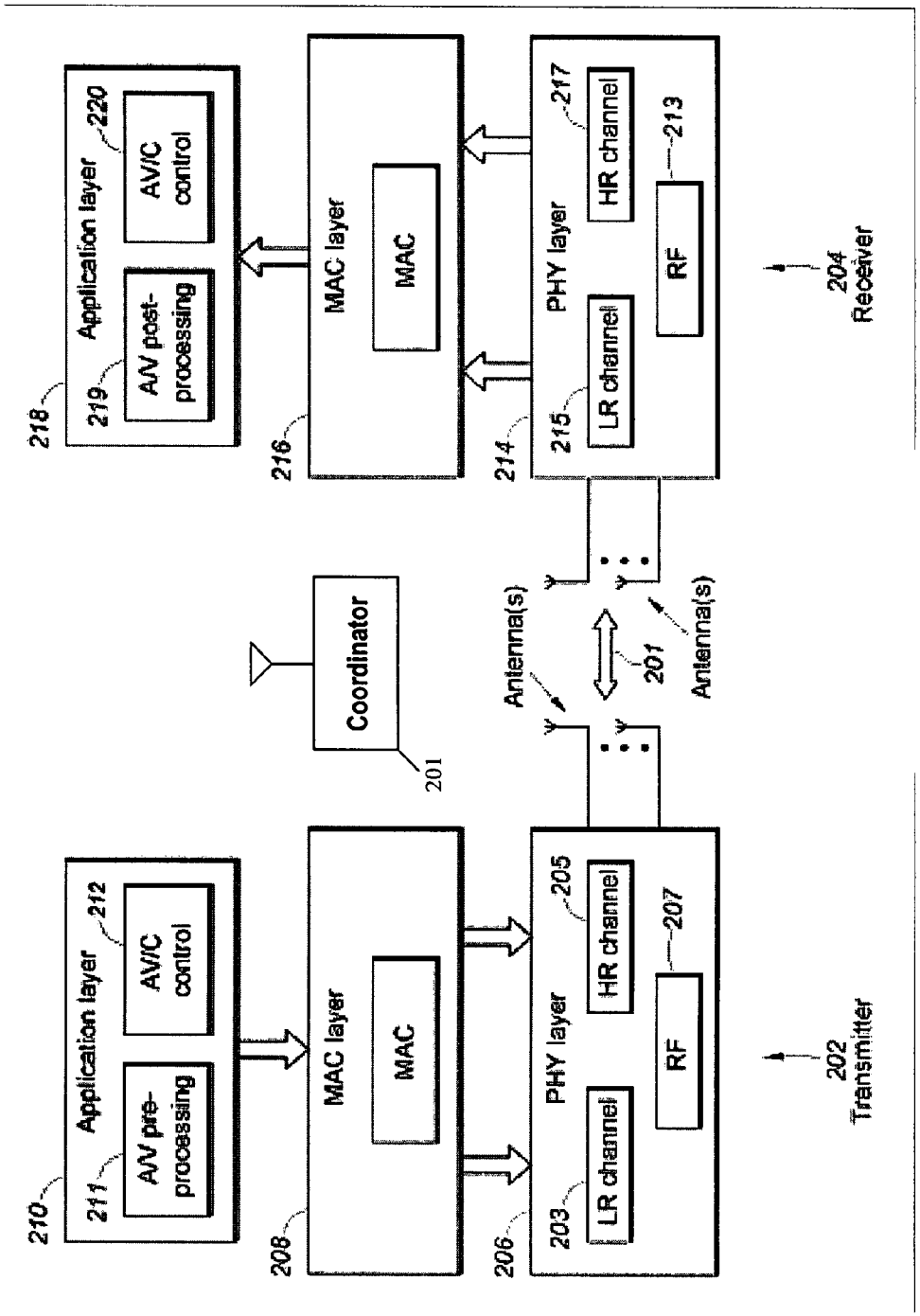
FIG. 12 shows another example functional block diagram of a sender and a receiver for video and data communication in a wireless network, according to the present invention.

FIG. 12 shows a functional block diagram of an example wireless communication system 200 including a transmitter (sender) station 202, a receiver station 204, and a coordinator functional module 201 that performs video and data transmissions, according to the present invention as described. The coordinator 201 implements the function of the coordinator 102 in FIG. 11. In FIG. 12, the coordinator 201 is a logical module that can be implemented as a stand-alone device (as in FIG. 11), or as part of the sender or the receiver (as in FIG. 1).

The sender 202 includes a PHY layer 206, a MAC layer 208 and an Application layer 210. The PHY layer 206 includes a radio frequency (RF) communication module 207 which transmits/receives signals under control a LR channel communication module 203 and a HR channel communication module 205. The Application layer 210 includes an audio/visual (A/V) pre-processing module 211 for packetizing streams which are converted to MAC packets by the MAC layer 208. The Application layer 210 further includes an AV/C control module 212 which sends stream transmission requests and control commands to the coordinator 201 to reserve channel time blocks for transmission of packets according to reserved time blocks, as described.

The receiver 204 includes a PHY layer 214, a MAC layer 216 and an Application layer 212. The PHY layer 214 includes a RF communication module 213 which transmits/receives signals under control of a LR channel communication module 215 and a HR channel communication module 217. The Application layer 210 includes an A/V post-processing module 219 for de-packetizing into streams, the video information in the MAC packets received by the MAC layer 216. The Application layer 210 further includes an AV/C control module 220 which handles stream control. Beamforming transmissions are performed over the high-rate channel.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of communicating information over one or more wireless channels in a network, comprising:
   controlling channel access among wireless stations by dividing channel time into one or more superframes, including schedules of channel time blocks (CTBs) for a high-rate channel and a low-rate channel;
   scheduling each superframe for communicating information, wherein scheduling includes creating one or more schedules each comprising CTBs including multiple inconsecutive reserved CTBs for communication of packets of information over one or more of the high-rate channel and one or more of the low-rate channel, wherein the low-rate channel and the high-rate channel cannot be used at the same time, and beacons and Acknowledge (ACK) packets are transmitted over the low-rate channel in between transmission of the information over the high-rate channel;
   and transmitting packets of information over the one or more of the high-rate channel and the low-rate channel during the reserved CTBs according to each schedule, wherein the high-rate channel transmission is single direction unicast and low-rate channel transmission is bi-directional, and the information comprises high definition (HD) uncompressed video information.

2. The method of claim 1 wherein a schedule further includes one or more unreserved CTBs for communication of control information.

3. The method of claim 1 wherein the information comprises video information and each schedule includes one or more reserved CTBs for communication of isochronous stream packets over the channel.

4. The method of claim 1 wherein:
   transmitting packets further includes transmitting packets of video information from a sender to a receiver over a high-rate channel during reserved CTBs, and transmitting acknowledgment (ACK) packets from the receiver to the sender over a low-rate channel during the reserved CTBs.

5. The method of claim 4 further including transmitting periodic beacons, wherein each pair of successive beacons define a superframe therebetween, and each beacon includes schedule timing allocations for the succeeding superframe for dividing the channel time into CTBs.

6. The method of claim 5 further comprising dynamically rescheduling utilizing sub-beacons.

7. The method of claim 4 wherein the superframe further comprises a contention-based control period (CBCP) for communicating control and management commands on the low-rate channel.

8. The method of claim 7 wherein the superframe further comprises a beam-tracking period for fine-tuning beamforming parameters to maintain link quality for beamforming transmissions over the high-rate channel.

9. The method of claim 7 wherein the superframe further comprises a beam-search period (BSP) for searching transmission beams.

10. The method of claim 7 wherein each beacon signals the start of a superframe.

11. The method of claim 7 wherein the beacon specifies the start time, and length of the CTBs for each schedule in the corresponding superframe.

12. The method of claim 11 wherein the beacon specifies allocation of CTBs to different stations including senders and receivers.

13. The method of claim 12 wherein the beacon further specifies allocation of CTBs to different video streams.

14. The method of claim 7 wherein channel access during the CFP is based on Time Division Duplex (TDD).

15. The method of claim 7 wherein each schedule comprises a series of evenly distributed reserved CTBs with equal length.

16. The method of claim 7 further comprising performing power saving wherein power saving (PS) devices contend for the unreserved CTBs immediately after a beacon.

17. The method of claim 7 further comprising:
a sender station transmitting a bandwidth request command for transmission of both isochronous streams and asynchronous data over a channel; and
if sufficient bandwidth remains in the channel, then a coordinator station allocating a schedule in the CFP to the sender station.

18. The method of claim 17 further comprising allocating multiple schedules to the sender.

19. The method of claim 17 further comprising the sender station transmitting multiple streams to a receiver over the channel during the allocated schedule.

20. The method of claim 17 further comprising:
the sender station transmitting a stream to a receiver station over the channel during the allocated schedule; and
the receiver station transmitting an ACK to the sender during the schedule.

21. The method of claim 20 wherein during a CTB, one or more packets are transmitted from the sender station to the receiver station, and one or more corresponding ACKs are transmitted from the receiver station to the sender station.

22. The method of claim 4 further comprising dynamically extending a reserved CTB into a following unreserved CTB to allow further packet communication.

23. The method of claim 22 wherein dynamically extending further includes:
a coordinator broadcasting a CTB extension announcement to announce that at least a portion of the unreserved CTB following the current reserved CTB is being used as an extension period for the current reserved CTB.

24. The method of claim 23 wherein the CTB extension announcement informs those stations that are not involved in communication during the current reserved CTB, to refrain from contending for the channel during the CTB extension period.

25. The method of claim 22 further comprising communicating video information during the CTB extension period.

26. The method of claim 25 further comprising dynamically truncating the CTB extension period upon completion of communication of video information during the reserved CTB.

27. The method of claim 4 further comprising dynamically truncating a reserved CTB.

28. The method of claim 27 wherein truncating further includes dynamically releasing unused channel time within a reserved CTB.

29. The method of claim 27 wherein truncating further includes broadcasting a truncation announcement to announce that stations can begin contention for the channel.

30. The method of claim 1, wherein the transmission of the low-rate channel is within a same frequency band as the high-rate channel.

31. The method of claim 1, wherein the HD uncompressed video information is transmitted over a 60 GHz frequency band.

32. The method of claim 1, wherein each scheduled CTB only includes a single data-ACK pair.

33. The method of claim 32, wherein the low-rate channel is used for control communications and does not support transmission of HD uncompressed video information.

34. The method of claim 1, wherein the low-rate bi-directional channel transmission is based on transmissions in two directions providing two-way communication.

35. A coordinator for managing communication of information over one or more wireless channels in a network, comprising:
a controller configured for receiving a bandwidth request from a source wireless station for transmission of information, and determining channel bandwidth availability;
and a scheduler configured for allocating available channel bandwidth by dividing channel time into one or more superframes including schedules of channel time blocks (CTBs) for a high-rate channel and a low-rate channel, CTBs including multiple inconsecutive reserved CTBs for communication of packets of information over the one or more wireless channels, wherein the low-rate channel and the high-rate channel cannot be used at the same time, and beacons and Acknowledge (ACK) packets are transmitted over the low-rate channel in between transmission of the information over the high-rate channel, wherein the high-rate channel transmission is single direction unicast and low-rate channel transmission is bi-directional, and the information comprises high definition (HD) uncompressed video.

36. The coordinator of claim 35 wherein a schedule further includes one or more unreserved CTBs for communication of control information.

37. The coordinator of claim 35 wherein the information comprises video information and each schedule includes one or more reserved CTBs for communication of isochronous stream packets over the channel.

38. The coordinator of claim 35 wherein the scheduler is configured for transmitting packets of video information from the source wireless station to a destination wireless station over a high-rate channel during reserved CTBs, and transmitting ACK packets from the destination wireless station to the source wireless station over a low-rate channel during the reserved CTBs.

39. The coordinator of claim 38 wherein the scheduler is further configured for transmitting periodic beacons, wherein each pair of successive beacons define a superframe therebetween, and each beacon includes schedule timing allocations for the succeeding superframe for dividing the channel time into CTBs.

40. The coordinator of claim 38 wherein the superframe further comprises a contention-based control period (CBCP) for communicating control and management commands on the low-rate channel.

41. The coordinator of claim 40 wherein the superframe further comprises a beam-tracking period for fine-tuning beamforming parameters to maintain link quality for beamforming transmissions over the high-rate channel.

42. The coordinator of claim 40 wherein the superframe further comprises a Beam-Searching Period (BSP) for searching better transmission beams.

43. The coordinator of claim 40 wherein each beacon signals the start of a superframe.

44. The coordinator of claim 40 wherein the beacon specifies the start time, and length of the CTBs in the corresponding superframe.

45. The coordinator of claim 44 wherein the beacon specifies allocation of CTBs to different stations including senders and receivers.

46. The coordinator of claim 45 wherein the beacon further specifies allocation of CTBs to different video streams.

47. The coordinator of claim 40 wherein channel access during the CFP is based on Time Division Duplex (TDD).

48. The coordinator of claim 40 wherein each schedule comprises a series of evenly distributed reserved CTBs with equal length.

49. The coordinator of claim 40 wherein one or more stations perform power saving (PS) by contending for the unreserved CTBs immediately after a beacon.

50. The coordinator of claim 38 wherein the scheduler is further configured for dynamically extending a reserved CTB into a following unreserved CTB to allow further communication.

51. The coordinator of claim 50 wherein the scheduler is further configured for dynamically extending a reserved CTB by broadcasting a CTB extension announcement to announce that at least a portion of the unreserved CTB following the current reserved CTB is being used as an extension period for the current reserved CTB.

52. The coordinator of claim 51 wherein the CTB extension announcement informs those stations that are not involved in communication during the current reserved CTB, to refrain from contending for the channel during the CTB extension period.

53. The coordinator of claim 50 wherein the source wireless station communicates video information during the CTB extension period.

54. The coordinator of claim 53 wherein the scheduler is further configured for dynamically truncating the CTB extension period upon completion of communication of video information during the reserved CTB.

55. The coordinator of claim 38 wherein the scheduler is further configured for dynamically truncating a reserved CTB.

56. The coordinator of claim 55 wherein the scheduler is further configured for dynamically releasing unused channel time within a reserved CTB.

57. The coordinator of claim 55 wherein the scheduler is further configured for broadcasting a truncation announcement to announce that stations can begin contention for the channel.

58. A wireless station for communication of information over one or more wireless channels in a network, comprising:
a controller module configured for requesting reservation of available channel bandwidth from a coordinator for transmission of information;
and a communication module configured for communication of packets of information over the one or more channels according to one or more schedules provided by the coordinator, wherein each schedule allocates available channel bandwidth by dividing channel time into one or more superframes including schedules for channel time blocks (CTBs) for a high-rate channel and a low-rate channel, each superframe including CTBs that include multiple inconsecutive reserved CTBs for communication of packets of information over the one or more channels, wherein the low-rate channel and the high-rate channel cannot be used at the same time, and beacons and Acknowledge (ACK) packets are transmitted over the low-rate channel in between transmission of the information over the high-rate channel, wherein high-rate channel transmission is single direction unicast and low-rate transmission is bi-directional, and the information comprises high definition (HD) uncompressed video transmitted over a 60 GHz frequency band.

59. The wireless station of claim 58 wherein the communication module is further configured for transmitting packets of video information to a destination wireless station over a high-rate channel during reserved CTBs, and transmitting ACK packets from the destination wireless station to the source wireless station over a low-rate channel during the reserved CTBs.

60. The wireless station of claim 59 wherein the coordinator transmits periodic beacons, wherein each pair of successive beacons define a superframe therebetween, and each beacon includes schedule timing allocations for the succeeding superframe for dividing the channel time into CTBs, such that the communication module is further configured for communication of packets of information over a channel using the schedule information in the beacon.

61. The wireless station of claim 60 wherein the communication module communicates information during a CTB extension period according to a schedule.

62. The wireless station of claim 60 wherein the communication module is further configured for transmitting a bandwidth request command for transmission of both isochronous streams and asynchronous data over a channel, and if sufficient bandwidth remains in the channel, then the coordinator station allocates a schedule in the CFP to the wireless station.

63. The wireless station of claim 60 wherein the communication module is further configured for performing power saving (PS) by contending for the unreserved CTBs immediately after a beacon.

64. The wireless station of claim 60 wherein the communication module is further configured for transmitting multiple streams to a receiver over the channel during an allocated schedule.

65. The wireless station of claim 60 wherein the communication module is further configured for transmitting a stream to a receiver station over the channel during the allocated schedule, such that the receiver station transmits an ACK to the wireless station during the schedule.

66. The wireless station of claim 60 wherein the communication module is further configured for transmitting one or more packets of information during a CTB to a receiver station, wherein one or more corresponding ACKs are transmitted from the receiver to the wireless station.

* * * * *